United States Patent [19]

Van Grinsven et al.

[11] 4,269,164

[45] May 26, 1981

[54] SWING-A-WAY CAMP GRILL

[76] Inventors: Donald R. Van Grinsven, 405 Buchanan Rd.; Michael H. Winius, 226 Kamps, both of Combined Locks, Wis. 54113

[21] Appl. No.: 17,734

[22] Filed: Mar. 5, 1979

[51] Int. Cl.³ ............... A47J 33/00; F16M 11/00; F24B 3/00
[52] U.S. Cl. .................. 126/30; 126/25 R; 126/25 A; 126/25 AA; 248/124; 248/156
[58] Field of Search .............. 126/9 R, 9 B, 25 R, 126/25 A, 25 AA, 30; 248/124, 125, 156, 165, 419

[56] References Cited

U.S. PATENT DOCUMENTS

| 4,065,085 | 12/1977 | Gellatly | 248/124 |
| 4,120,280 | 10/1978 | Iverson | 126/30 |

Primary Examiner—George T. Hall

[57] ABSTRACT

A ground supported adjustable grill device comprising a single support leg element formed of a plurality of tubular members, the upper member being an inverted L-shape. Suspended from the upper L-shaped member is a grill or cooking utensil removably attached at one end of a flexible element, which in turn attaches to the single support leg member for stability, selective adjustment, and further being horizontally pivotal by means of a support leg member.

5 Claims, 7 Drawing Figures

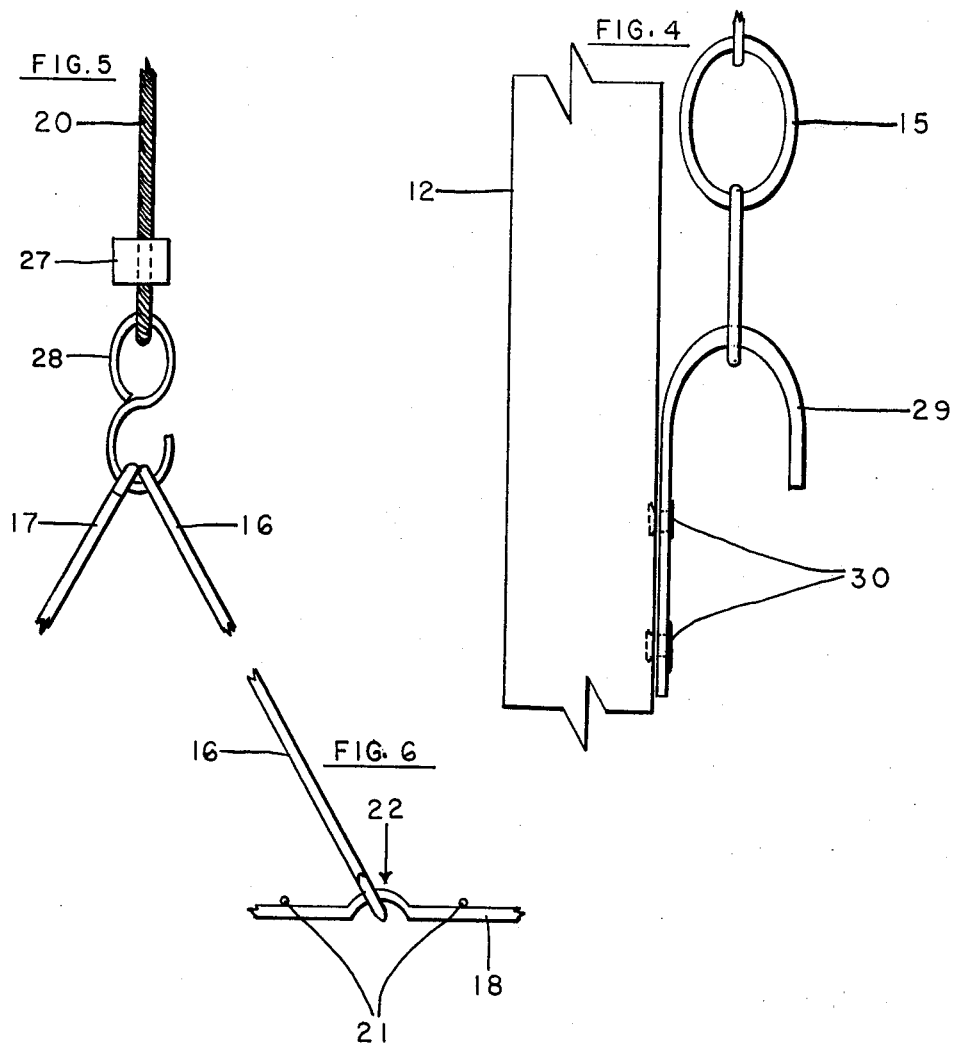
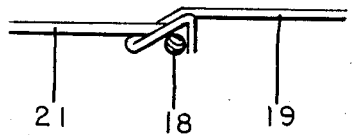

SWING-A-WAY CAMP GRILL

BACKGROUND OF THE INVENTION

1. This invention relates generally to supports for cooking utensils, specifically to a device that can adjustably support a grill above a fire or other suitable heat sorce.

2. Multiple devices have been proposed to support cooking utensils over a fire or other suitable heat sources. However, so far as we are aware, there has not been a device with a minimum of parts that allows for both infinite vertical and horizontal adjustment of a grill or cooking utensil, uniquely simple in its construction, extremely durable and sturdy, and be broken down for easy handling, portability, and storage.

SUMMARY OF THE INVENTION

It is an object of the present invention to provide a ground supported grill device.

It is another object of the present invention to provide an adjustable grill device which permits a grill or cooking utensil to be adjusted both vertically and horizontally as appropriate toward and away from a fire or suitable heat source.

It is yet another object of the present invention to provide a grill device that can be knocked down for easy handling, portability, and storage.

These and other objects are achieved according to the present invention by providing a ground supported adjustable grill device having: a single support leg element formed of a plurality of tubular members, thereby singularly having distinct separate functions of operation; plurally providing for support of a grill or cooking utensil.

The head assembly is advantageously formed to provide for support of a grill or cooking utensil over a fire or suitable heat source relatively parallel to the vertical plane formed by the lower members of the support leg element, thereby means of a flexible element extending through the head assembly and upon extension thereof, preferably in the form of a chain, can be adjustably suspended and positively latched to a fastening device suitably secured to the hook assembly.

Principle features of the single support leg element are comprised of tubular members; specifically a ground post, a hook assembly, a connecting member, and a head assembly. These together with other objects and advantages which will subsequently become apparent reside in the detail of construction and operation as more fully hereinafter described and claimed, reference being made to accompanying drawings forming a part hereof, wherein like numerals refer to like parts throughout.

DESCRIPTION OF DRAWINGS

FIG. 4 is an enlarged fragmentary sectional view taken generally along the line 4—4 of FIG. 1.

FIG. 5 is an enlarged fragmentary sectional view taken generally along the line 5—5 of FIG. 1.

FIG. 6 is an enlarged fragmentary sectional view taken generally along the line 6—6 of FIG. 1.

FIG. 7 is an enlarged fragmentary sectional view taken generally along the line 7—7 of FIG. 1.

DETAILED DESCRIPTION

Figure 1:
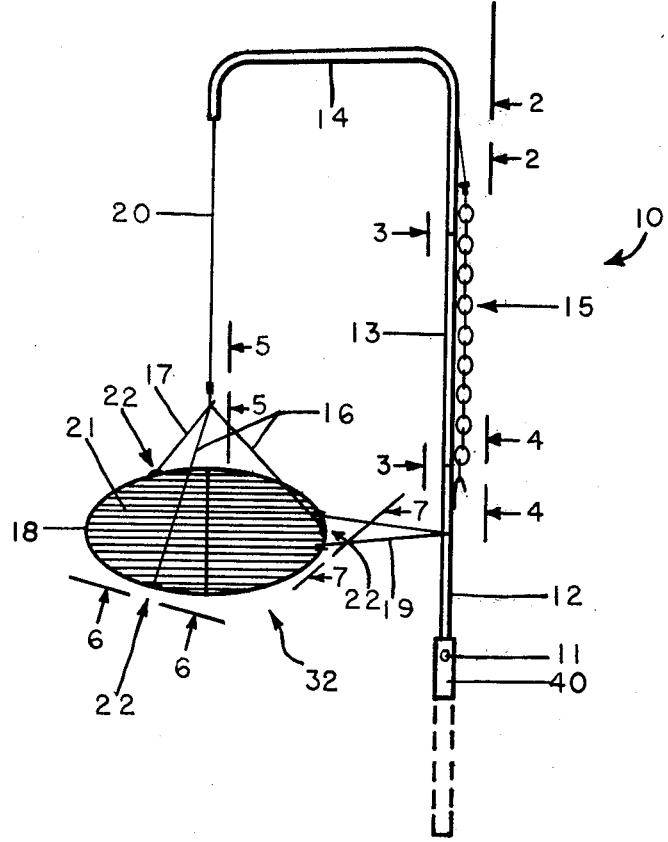
FIG. 1 is a fragmentary perspective view showing a ground supported knockdown adjustable grill device according to the present invention.

Refering now more to FIG. 1 of the drawings, a ground supported adjustable knockdown grill device (10) according to the present invention includes a single support leg element formed of a plurality of tubular members, a ground post (40), a hook assembly (12), a connecting member (13), and a head assembly (14), wherein conjointly support and suspend a cooking utensil, such as a grill (32) over a fire or suitable heat source (not shown).

Figure 3:
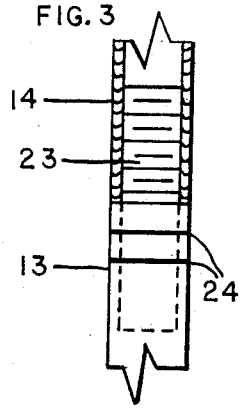
FIG. 3 is an enlarged fragmentary sectional view taken generally along the line 3—3 of FIG. 1.

The preferred assembly of the present invention (10) begins with insertion of the ground post (40) into any suitable soil or material composition to a desired length, preferably utilizing the round aperture (11) as a guide. The ground post (40) therein becomes a receptacle by insertion for the hook assembly (12), wherein respectively becomes a receptacle by insertion for the dual ended connecting member (13) by means of a threaded rod (FIG. 3/23) secured permanently by compression (24) to the connecting member (13), wherein the head assembly (14) inserts respectively onto the other threaded rod (23) of same (13). This method of connection is therefore one of friction, additionally allowing for easy knockdown if said connection is bound by foreign matter accumulated in use. By this arrangement it can be appreciated that this plurality of tubular members (40,12,13,14) can thus be horizontally pivotal 360 degrees.

Figure 2:
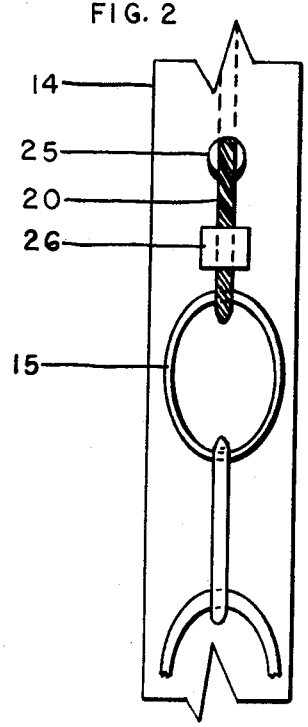
FIG. 2 is an enlarged fragmentary sectional view taken generally along the line 2—2 of FIG. 1.

The head assembly (14) is a configuration of suitable length and inverted L-shape through which a flexible element is longitudinally extended, such as a cable (20). As best can be seen in FIG. 2, one end of the cable (20) protrudes through a longitudinal eliptical aperture (25) appropriately positioned on the head assembly (14), thereby further extended by another flexible element, such as a chain (15), whose link diameter's are appropriate for securement to a fastener in the form of a conventional tarp hook (FIG. 4/29), thereon secured by appropriate fasteners (30) to the hook assembly (12). As the chain (15) is adjustably attached to the tarp hook (29), the grill (32) is removably attached at the other longitudinal end of the cable (20). As best can be seen in FIG. 5, the cable (20) end is permanently formed in a loop by means of a fastener, preferably a cable clamp (27), thereby providing for attachment of a fastener in the form of an S-hook (28). Thus the forementioned mechanisms (FIG. 1-5) provide for a support arrangement, vertical adjustment, and horizontal pivot of the grill (32) in a relatively simple manner.

The grill (32) is essentially a planar circular grate with the support arrangement further including at least three branches (16,17), two branches (16) comprised of a single rigid element; one branch (17) comprised of an additional rigid element, said branches (16,17) disposed connected to and extending from the grill (32) with the connection being achieved as by the illustrated S-hook (28). Each of the branches (16,17) terminates at the ends thereof spaced from the S-hook (28), as best seen in FIG. 6, with the connection being achieved upon engagement of a convex protrusion (22) relative to the top plane of the grill (32), substantially equally spaced at points on the rim (18) thereof around the circumference of the grill (32).

As best can be seen in FIG. 7, a further support arrangement for both vertical and horizontal stability is a rigid element (19) appropriately formed to engage securely grate members (21) and the rim (18) of the grill (32), and adjustably slidable around the hook assembly (12). This rigid element (19) can additionally be utilized as a handle device independent of its relationship to the hook assembly (12), wherein it can engage the appropriate grate members (21) of the grill (32) in the forementioned prescribed manner.

As can be appreciated from the above description and illustrated drawings the present invention provides a simple yet sturdy and durable apparatus for cooking over a fire or suitable heat source, wherein can also be broken down by disconnection of the grill (32), head assembly (14), connecting member (13), hook assembly (12), and extraction of the ground post (40) by means of inserting the tarp hook (29) into the round aperture (11), appropriately positioned on the ground post (40), with an upward pulling motion.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A ground supported adjustable and knockdown grill device comprising a single support leg element formed of a plurality of tubular members, an upper member being an inverted L-shape and having a flexible element extending through to provide a support for a grill member or cooking utensil, said flexible element having an additional flexible element member as an extension thereof to provide vertical adjustment of said grill or cooking utensil, said grill or cooking utensil being secured to the support leg element for stability thereof, the grill or cooking utensil further being pivotal 360 degrees in a horizontal plane by means of a support leg member.

2. A structure as defined in claim 1 wherein at least one support leg member is comprised of threaded elements positively fastened thereon and engage with at least two additional support leg members by means of a friction fit.

3. A structure as defined in claim 1 wherein stability means further to include a rigid element appropriately formed to engage, in a secure fashion, grate members and peripheal rim of a grill, said rigid element adjustably slidable relative to the support leg element, said rigid element utilized capably as well as a handle device independent of its relationship to the support leg element.

4. A structure as defined in claim 1 wherein provision for vertical adjustment means further to include a fastener secured to a support leg member to adjustably receive and engage an extended flexible element.

5. A structure as defined in claim 1 wherein pivotal in a horizontal plane means to further include pivotal 360 degrees.

* * * * *